United States Patent
Wünsch et al.

[11] Patent Number: 6,129,847
[45] Date of Patent: Oct. 10, 2000

[54] RECOVERY OF RAW MATERIALS FROM MAGNETIC RECORDING MEDIA

[75] Inventors: Thomas Wünsch, Speyer; Karl-Heinz Sartor, Neuried; Axel-Rüdiger Schulze, Offenburg; Norbert Müller, Friedelsheim; Jochen Eicher, Neustadt; Oskar Stephan, Hockenheim, all of Germany

[73] Assignee: BASF Magnetics GmbH, Ludwigshafen, Germany

[21] Appl. No.: 08/704,734

[22] PCT Filed: Feb. 25, 1995

[86] PCT No.: PCT/EP95/00695

§ 371 Date: Sep. 9, 1996

§ 102(e) Date: Sep. 9, 1996

[87] PCT Pub. No.: WO95/24443

PCT Pub. Date: Sep. 14, 1995

[30] Foreign Application Priority Data

Mar. 9, 1994 [DE] Germany ............... 44 07 900

[51] Int. Cl.⁷ .............. B08B 3/08; C23F 4/00; B01D 11/02; B01D 35/06
[52] U.S. Cl. .......... 210/695; 210/744; 210/767; 210/772; 210/800; 134/2; 134/10; 134/22.17; 134/29; 510/109; 510/181; 510/202; 510/206; 510/417
[58] Field of Search ............... 523/181; 510/202, 510/206, 417, 109, 435; 210/695, 744, 767, 772, 800; 134/2, 10, 22.16, 22.17, 22.19

[56] References Cited

U.S. PATENT DOCUMENTS 4,568,612  2/1986  Lehner et al. .
5,246,503  9/1993  Minick .

FOREIGN PATENT DOCUMENTS 2 130 124  5/1984  United Kingdom .
2 202 837  10/1988  United Kingdom .

OTHER PUBLICATIONS

WPI/Derwent; JP60223835 A (Abstract), Aug. 11, 1985.
Korean Abst. 8903–614, Aug. 1986.
Abstract EP 75–757, Sep. 1981.
Abstract DT 2727–514, Jun. 1977.
Abstract JO 2292–723, May 1989.
Abstract J5 3070–404, Dec. 1976.
Abstract JO 1317–707, Jun. 1988.
Abstract J6 2167–601, Jan. 1986.
Abstract J5 7146–624, Mar. 1981.
Abstract J5 3112–979, Mar. 1977.
Abstract J5 3092–879, Jan. 1977.

Primary Examiner—David A. Reifsnyder
Attorney, Agent, or Firm—Keil & Weinkauf

[57] ABSTRACT

Magnetic powder and substrate material are separately recovered from finely chopped wastes of magnetic recording media consisting of a polymeric substrate and a magnetic layer present thereon in which finely divided magnetic powder is dispersed in crosslinked or uncrosslinked polymeric binder by treating the finely chopped wastes of magnetic recording media in a solution consisting of the potassium salt of a polyunsaturated fatty acid, or a biodegradable cleaning agent comprising phosphates, surfactants and a complexing agent, and one or more organic solvents or water while being subjected to mechanical action, and separately removing the magnetic powder from the substrate material by washing or sedimentation or in a magnetic separator.

7 Claims, 1 Drawing Sheet

Figure
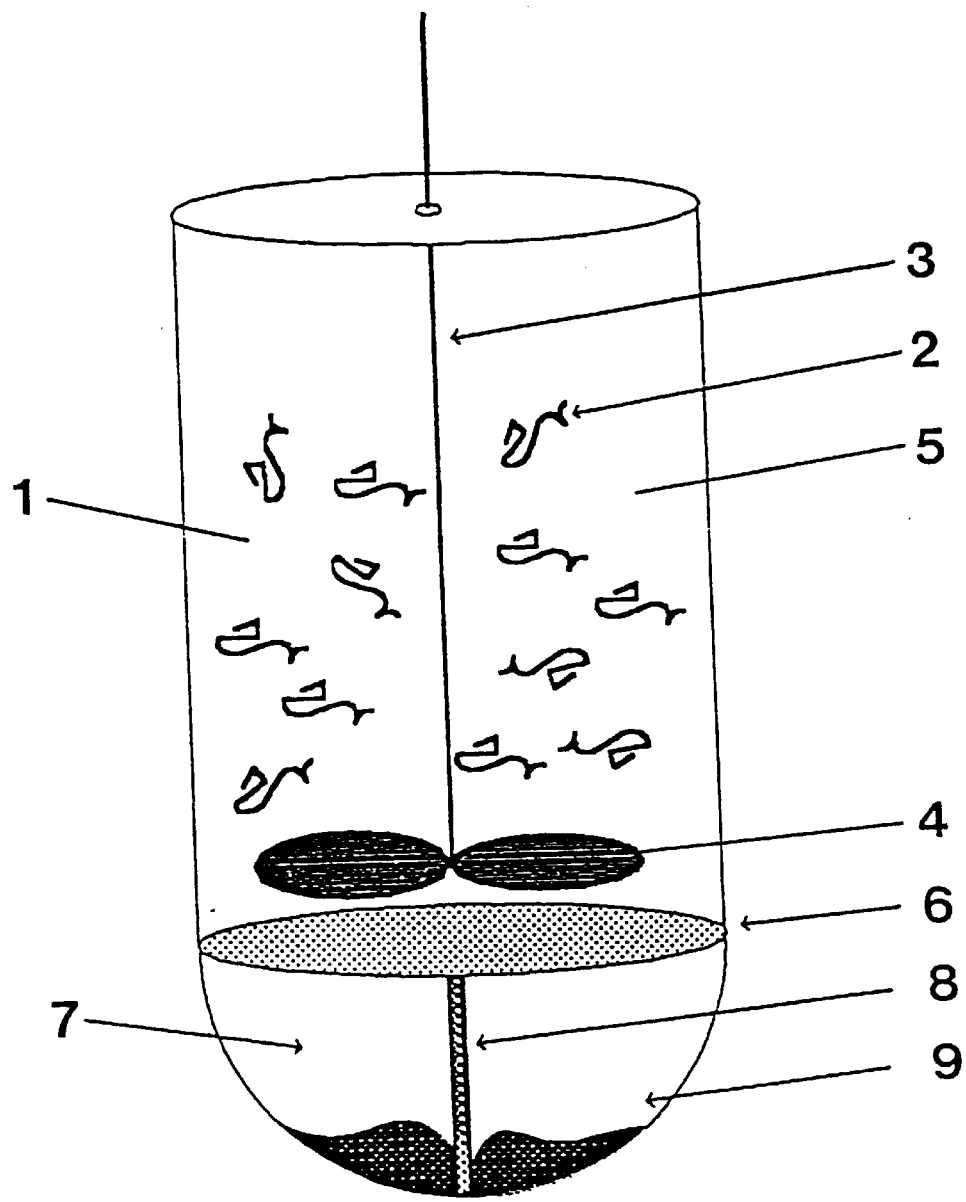

RECOVERY OF RAW MATERIALS FROM MAGNETIC RECORDING MEDIA

The invention relates to a process for recovering raw materials from finely chopped wastes of magnetic recording media, consisting of a polymeric substrate and a magnetic layer present thereon, in which finely divided magnetic powder is dispersed in crosslinked or uncrosslinked polymeric binder, the magnetic powder and the substrate material being recovered by treatment in an alkaline medium.

In recent years, the rapid growth of the information industry has resulted in extensive consumption of large amounts of magnetic storage media, such as computer tapes, audio tapes, video tapes and diskettes. In particular, magnetic tapes and diskettes which have, for example, polyethylene terephthalate as the substrate have been produced in growing amounts in recent years, owing to their excellent magnetic and mechanical properties. In general, residues and wastes of such storage media occur in large amounts in the production and during use by the end users. At present, such wastes are disposed of by depositing them with the domestic waste in sanitary landfills or incinerating them in incineration furnaces. From the point of view of waste reduction and the recovery of useful materials, full utilization of such wastes is an outstanding requirement.

A process of the generic type stated at the outset is disclosed in German Offenlegungsschrift DOS 3,341,608. According to this publication, the magnetic tape wastes are finely shredded, after which the magnetic layer and the substrate are delaminated in aqueous alkaline solution and the magnetic powder is separated from the substrate by stirring at high speed. This process requires a very complicated bulky apparatus.

Further processes which are based on separation of the magnetic layer from the substrate by treatment with a base are described in Japanese Applications 112 979 (1978), 006 985 (1979), 070 404 (1978), 092 879 (1978) and 167 601 (1987) and Korean Application 89/03614. Japanese Applications 313 707 (1988), 112 413 (1989) and 146 624 (1982) describe separation by treatment with an acid. Japanese Application 054 050 (1983) describes the use of a solvent mixture comprising phenol and tetrachloroethane for delamination of the magnetic layer.

U.S. Pat. No. 5,246,503 discloses a delamination solution for coatings which consists of organic solvent, water, thickener and wetting agent, but where in addition the coating has to be removed mechanically by scratching.

If it is intended to delaminate the magnetic layer and the substrate and the aim is to recover the useful materials, in particular the magnetic powder and the polyethylene terephthalate, the PET film should as far as possible not be chemically degraded or attacked. If, on the other hand, polyurethanes crosslinked in the magnetic layer, are used as binders as described, for example, in European Patent 0,099, 533, the processes described above are for the most part unsuccessful or give unsatisfactory results with regard to separation, delamination and recovery.

German Application P 43 30 839.9 discloses a process for recovering raw materials from magnetic recording media, in which these raw materials in finely chopped form are treated in organic solvents, an acid which is soluble therein and alcohols or thioalcohols and, if required, surfactants at elevated temperatures, the magnetic layer delaminated in this manner being separated from the substrate by a washing process, and thereafter both the finely shred substrate wastes and the magnetic powder being dried. That feature of this process which is essential for the invention is that the ester groups of the polyurethane binder are cleaved by hydrolysis by the stated treatment medium, whereas at the same time the ester groups of the polyethylene terephthalate substrate are not chemically destroyed. It has been found that it is difficult in this process to fulfill these boundary conditions; furthermore, the finely shred wastes must be treated for many hours in order to achieve complete separation.

It is an object of the present invention to provide a process of the generic type stated at the outset, in which the magnetic layer is delaminated from the PET substrate film without the latter being chemically cleaved. It is a further object of the present invention to find reaction conditions under which only a short reaction time is required for delamination and separation of magnetic powder and polyethylene terephthalate substrate film.

We have found, completely surprisingly, that this object is achieved by treating the abovementioned magnetic recording media in finely chopped form in an alkaline medium, consisting of the potassium salt of a polyunsaturated fatty acid, one or more organic solvents and, if required, water and, if required, a suitable catalyst, while stirring and at elevated temperatures.

We have found that this object is furthermore achieved by an alkaline composition in which a biodegradable cleaning agent consisting of specific phosphates, surfactants and completing agents, which has a pH of >10, is used instead of the potassium salt of a polyunsaturated fatty acid. As described in more detail further below, the further treatment is carried out essentially as in the abovementioned German Application P 43 30 889.9, so that the useful materials thus recovered, ie. the polymeric substrate material and the magnetic powder can be fed to further processing and use steps in the manner customary for them.

The novel process and the apparatuses required for carrying out the process and reactants and boundary conditions are described in more detail below.

The polymeric substrate material which may be used in the novel process may consist of polyethylene terephthalate (PET), polyethylene naphthalate (PEN), polycarbonate, cellulose, polyamide, polyimide, vinyl polymers or other polymers. These substrates may have been corona-treated or provided with a layer of adhesive-forming components, as disclosed in the prior art.

The binders used in the prior art magnetic layer are usually polyurethanes, which in general are synthesized from diisocyanates, polyesterols as flexible segments, low molecular weight alcohols and amino alcohols having a relatively high functionality and short-chain diols as chain extenders. However, polycarbonate/polyurethanes and polyurethanes composed of other segments are also known.

The polymeric binder may, however, also be a mixture of polyurethane with copolymers of vinyl chloride, vinyl acetate and vinyl alcohol, copolymers of vinylidene chloride and acrylonitrile, polyvinyl acetals, for example polyvinyl formal, or cellulose derivatives, such as nitrocellulose, and phenoxy resins and epoxy resins.

The stated binders may be present as an uncrosslinked or crosslinked matrix, in general polyfunctional isocyanates, if necessary supported by a crosslinking catalyst, acting as crosslinking agents.

Suitable magnetic powders are the conventional pigments used in producing the magnetic recording media, such as $\gamma\text{-Fe}_2\text{O}_3$, $\text{Fe}_3\text{O}_4$, berthollide iron oxides $\text{FeO}_x$, where $1.33<x<1.50$, $\text{CrO}_2$, metal powders or metal alloy powders and mixtures thereof.

The alkaline treatment medium consists of the potassium salts of polyunsaturated fatty acids (trivial name soft soap), one or more organic solvents and, if required, water and a catalyst.

The abovementioned biodegradable cleaning agent, consisting of specific phosphates, surfactants and complexing agents, is known under the trade name Mukasol®.

The fact that it is not the high pH of >10 alone which is critical for complete and rapid delamination of the magnetic layer, as is known from the cited prior art, is shown by Comparative Sample 3 of Example 1, in which a composition consisting of Newamatic®, a washing agent having a pH of 12 and the stated solvents was used. Here, no delamination was observed in the course of 1 hour at boiling point.

If, in the stated composition, the potassium salt of the polyunsaturated fatty acid is replaced by, for example, the sodium salt of a saturated fatty acid (trivial name curd soap), delamination is more difficult or impossible.

Suitable organic solvents are N-methylpyrrolidone, dimethylformamide, dimethyl sulfoxide, methyl ethyl ketone, dibutyl ether, tetrahydrofuran, 1,4-dioxane, acetone, cyclohexanone, toluene, xylene, chloroform, methylene chloride, trichloroethylene, isopropanol, methanol, ethanol, butanone and tetrachloroethane and in particular mixtures thereof and mixtures with water.

The basic catalyst sodium methylate, potassium tert-butylate, sodium oxaloacetate or dimethylaminopyridine has proven a particularly useful catalyst, but o-butyl titanate or simply NaOH is also suitable as an additive.

In addition, surfactants may also be used, in a combination with the abovementioned components, for delamination of the magnetic layer. Examples of suitable surfactants are higher fatty acids or oxo alcohols which have been alkoxylated with ethylene oxide, propylene oxide or butylene oxide so that they are soluble or dispersible in the solvent system, for example C-13 or C-15 oxo alcohol ethoxylated with 3 units of ethylene oxide.

As stated above, the composition described above operates in the alkaline range from pH 9 to pH 13, preferably from pH 10 to pH 12.

To carry out the novel process, the magnetic recording medium is cut into small or medium-sized pieces and the stated washing solution is added. This may advantageously be effected in a reactor space, as shown in the FIGURE.

In the upper part (1) of the reactor space, the film shreds (2) are introduced and are mixed thoroughly by means of the stirrer (3) having the paddles (4) with the treatment liquid (5) present in the reactor space. The reaction temperature is close to the boiling point, ie. from 60 to 95° C., preferably from 85 to 90° C. The addition of small steel pins or grinding balls composed of steel or ceramic in order to achieve optimum friction against the magnetic layer is also advantageous.

After a few minutes, the delamination process is complete. Separation of the magnetic powder from the substrate film may be effected, as shown in the Figure, by arranging, between the upper part (1) and the lower part (7) of the reactor space, a perforated plate (6) which is so fine-meshed that it is permeable only for the magnetic powder removed but not for the film shreds of the magnetic recording medium. Consequently, the magnetic powder removed collects in the lower reactor space (7) owing to gravitational force and remains there. No fluidization takes place since the action of the stirrer in the lower reactor space is negligible owing to the perforated plate. The lower reactor space may additionally be divided by a plurality of partitions (8).

The reaction time is dependent on the composition of the washing solution used and on the treatment temperature and is not more than one hour. In order to reduce the reaction time, the action of ultrasonics is also preferred in addition to the thorough stirring of the finely chopped magnetic tape wastes.

The magnetic powder removed can then be separated completely from the film shreds by washing with the solvent mixture used or with pure solvents. The addition of suitable flocculants, such as copolymers based on acrylamide, or magnetic separators known from the stated prior art, such as permanent magnets or magnets energized by alternating current, is advantageous.

The film shreds can then be dried in an air stream or under reduced pressure and then put to further use. In carrying out the novel process, it has been found that the substrate shreds have essentially unchanged properties compared with substrates used for the first time.

The magnetic sludge, consisting of solvents and magnetic powder, is freed from the solvent and the magnetic powder is dried under reduced pressure. It can be processed by existing technologies to give magnetic pigments again. It has also been found that the treatment solutions described are suitable for reuse, ie. do not have to be destroyed after each delamination process.

EXAMPLE 1

A magnetic dispersion having the composition

|  | Parts by weight |
| --- | --- |
| Finely divided acicular $CrO_2$ | 11 |
| High molecular weight polyurethane | 1.6 |
| Vinyl copolymer VAGH | 0.6 |
| Lubricant | 0.04 |
| Dispersant | 0.2 |
| crosslinking agent, diisocyanate | 0.4 |
| Solvent | 23 | is cast on a nonmagnetic 15 μm thick polyethylene terephthalate substrate by means of a conventional extrusion coater to give a layer which is 3.5 μm thick when dry, and said layer is then dried, calendered and subjected to aftertreatment at elevated temperatures. For the production of video tape, the coated films are slit into half inch widths (1.27 cm) in the longitudinal direction. The magnetic recording medium thus produced is cut into pieces from 5 to 30 cm long and subjected to the following treatment according to Table 1 in order to recover substrate material and magnetic powder by the novel process.

The film pieces are initially taken in a round-bottom flask and the novel solvent mixture is added. The amounts used are shown in the Table. The mixture is heated while stirring. After the time shown in the Table, within which the coating has been removed, the mixture is allowed to cool and is filtered through a fine-meshed sieve. Washing is carried out with tetrahydrofuran (THF) and water, and the remaining film pieces are dried in a drying oven. The magnetic powder washed away is freed from the solvent and dried under reduced pressure.

The stated washing solution has a pH of 12 in each case. The reaction temperature corresponded to the boiling point of the washing solution. This washing solution can be reused several times, which is an additional advantage.

TABLE 1

| Sample | Solvent | Catalyst | Cleaning agent | Delamination time (min) |
|---|---|---|---|---|
| 1 | 65 dioxane, 32 water | | 3 S | 28 |
| 2 | 62 dioxane, 32 water | | 6 S | 25 |
| 3 | 70 dioxane, 15 water | | 15 S | 20 |
| 4 | 65 dioxane, 32 methanol | | 3 S | 7 |
| 5 | 65 xylene, 32 methanol | | 3 S | 22 |
| 6 | 65 butanone, 32 methanol | | 3 S | 18 |
| 7 | 65 tetrahydrofuran, 32 methanol | | 3 S | 8 |
| 8 | 65 tetrahydrofuran, 32 ethanol | | 3 S | 17 |
| 9 | 81 tetrahydrofuran, 16 methanol | | 1 S | 5 |
| 10 | 81 tetrahydrofuran, 16 methanol | | 0.5 S | 8 |
| 11 | 81 tetrahydrofuran, 16 methanol | 0.05 NaOCH$_3$ | 3 S | 2.5 |
| 12 | 81 tetrahydrofuran, 16 methanol | 0.05 o-butyl titanate | 3 S | 2.5 |
| 13 | 81 tetrahydrofuran, 16 methanol | | 3 M | 10 |
| Comparative Sample 1 | 65 tetrahydrofuran, 32 water | | 3 C | — |
| Comparative Sample 2 | 65 tetrahydrofuran, 32 methanol | | 3 C | — |
| Comparative Sample 3 | 81 dioxane, 16 water | | 3 N | — |

All data in grams; S = soft soap; C = curd soap; M = Mukasol ®; N = Newamatic ®

EXAMPLE 2 (ALL DATA IN PARTS BY WEIGHT)

In each case three roughly 3 cm long strips of commercial half inch (1.27 cm) wide video tapes were treated in a mixture of 58 parts of tetrahydrofuran, 12 parts of methanol and 1.2 parts of soft soap at the boil. The following results were obtained.

TABLE 2

| Video tape type | Delamination time |
|---|---|
| RELAX HGX E240 | 30 minutes |
| PDM EHG E240 | 5 minutes |
| Scotch S-VHS | 10 minutes |
| Scotch EG+ E180 | 10 minutes |
| Unilever SUM HG E180 | 10 minutes |
| TDK E-HG | 5 minutes |
| JVC SX 195 | 10 minutes |
| Kendo SHG E195 | 10 minutes |
| Sony V | 3 minutes |
| Maxell HGX Black E180 | 9 minutes |
| Maxell HGX Black prof. | 7 minutes |
| Maxell XR-S S-VHS | 10 minutes |
| Maxell VX 195 | 10 minutes |
| Fuji HQ E195 | 30 minutes |
| Fuji S-HG E180 | 30 minutes |
| Kodak HS 240 | 7 minutes |

EXAMPLE 3

In each case three roughly 30 mm long 3.81 mm wide strips of commercial audio cassette tapes were treated in a mixture as in Example 2, at the boil. The results are shown in Table 3.

TABLE 3

| Tape type | Delamination time |
|---|---|
| Sony | 2 minutes |
| UXS Type II High CrO$_2$ | 2 minutes |
| UX Pro90 LEC II Type II | 2 minutes |
| HF 90 Type I | 2 minutes |
| Esprit II | 2 minutes |
| Fuji GT-IIx90 Type II | 2 minutes |
| Fuji JP-IIx90 Double Coating | 3 minutes |
| TDK D 60 Type I | 5 minutes |
| TDK SF 60 Type II | 2 minutes |
| TDK SA-X Type II | 2 minutes |
| TDK SA90 High Position | 5 minutes |
| Maxell XL II 90 | 5 minutes |
| Maxell XL II S 90 | 30 minutes |
| Maxell UR-F 90 | 3 minutes |
| Maxell UR 90 | 4 minutes |

EXAMPLE 4

A commercial video tape was treated in a mixture according to Example 2 at the boil, but the amount of soft soap was changed and water was added. The results are shown in Table 4.

TABLE 4

| Soft soap | Water | Delamination time |
|---|---|---|
| 1.2 parts | — | 15 minutes |
| 1.2 parts | 0.2 | 23 minutes |
| 6 parts | 0.2 | 15 minutes |
| 1.2 parts | 0.6 | 26 minutes |

EXAMPLE 5

In each case 5 cm$^2$ of finely chopped, commercial floppy disk material coated on both sides were treated in a mixture as in Example 2 at the boil. The results are shown in Table 5.

TABLE 5

| Diskette type | Delamination time |
|---|---|
| RPS 3.5" | 2 minutes |
| Teijin 3.5" | 5 minutes |
| Nippon-Columbia 3.5" | 4 minutes |
| BASF 5.25" | 4 minutes |
| BASF 3.5" | 4 minutes |

EXAMPLE 6

In each case 5 cm$^2$ of finely chopped, commercial half inch wide (1.27 cm) computer tape which was intended for the type 3480 mono reel cassette in which the magnetic layer was cast on a corona-treated PET film were treated in a mixture as in Example 2 at the boil, with various additives, the results shown in Table 6 being obtained.

TABLE 6

| Additive (parts) | pH | Delamination time (min) |
|---|---|---|
| 0.01 of NaOH | 9 | 9 |
| 1.2 of potassium tert-butylate | 9 | 30 |
| 0.6 of sodium oxaloacetate | 11 | 3 |
| 1.2 of dimethylaminopyridine | 11 | 30 |

EXAMPLE 7

Results similar to those in Example 6 were obtained when the procedure was as in Example 6 except that the magnetic layer had been cast on a PET substrate provided with a 0.2 μm thick layer of adhesive-forming components.

EXAMPLE 8

Results similar to those in Example 6 were obtained when, in the solvent mixture, the 12 parts of methanol were replaced by equal amounts of ethanol, i-propanol or toluene.

EXAMPLE 9

This mixture was treated as in Example 6, except that 12 parts of soft soap were used. The delamination time was then 30 minutes (when further additives from Table 6 were absent).

EXAMPLE 10

The procedure was as in Example 6, except that 58 parts of dioxane, 12 parts of ethanol and 12 parts of soft soap were used as the treatment solution. The delamination time was 30 minutes.

If the Examples are considered together with the Comparative Examples, it is evident that, by a suitable choice of the treatment solution and the treatment parameters, complete delamination of the magnetic layer is achievable in a short treatment time without damaging the polyethylene terephthalate substrate.

We claim:

1. A process for separately recovering the magnetic powder and the substrate material from finely chopped wastes of magnetic recording media, consisting of a polymeric substrate and a magnetic layer present thereon, in which finely divided magnetic powder is dispersed in crosslinked or uncrosslinked polymeric binder, wherein the finely chopped waste of magnetic recording media is treated in a solution consisting of
a) the potassium salt of a polyunsaturated fatty acid, or
b) a biodegradable cleaning agent comprising phosphates, surfactants and a complexing agent, and one or more organic solvents or water while being subjected to mechanical action, and the magnetic powder removed is then separated from the substrate material by washing or sedimentation or in a magnetic separator.

2. The process of claim 1, which is carried out in the presence of a catalyst.

3. The process of claim 1, wherein the organic solvent is selected from the group consisting of dioxane, N-methylpyrrolidone, dimethylformamide, dimethyl sulfoxide, dibutyl ether, methyl ethyl ketone, tetrahydrofurane, 1,4-dioxane, acetone, cyclohexane, toluene, xylene, isopropanol, methanol, ethanol, butanone or a mixture thereof.

4. The process of claim 2, wherein the catalyst is selected from the group consisting of sodium methylate, potassium tert-butylate, sodium oxaloacetate, dimethylaminopyridine or o-butyl titanate.

5. The process of claim 1, which is carried out at a pH of from 10 to 12, at from 60 to 95° C. while stirring and/or with the action of ultrasonics.

6. The process of claim 1 which is carried out in the presence of surfactants, which in the case when there is a biodegradable cleaning agent, are in addition to the surfactants in the biodegradable cleaning agent.

7. The process of claim 1, wherein the surfactants are higher fatty acids or oxo alcohols which have been alkoxylated with ethylene oxide, propylene oxide or butylene oxide.

* * * * *

UNITED STATES PATENT AND TRADEMARK OFFICE
CERTIFICATE OF CORRECTION

PATENT NO.: 6,129,847

DATED: October 10, 2000

INVENTOR(S): WUENSCH et al.

It is certified that error appears in the above-identified patent and that said Letters Patent is hereby corrected as shown below:

On the cover page, item [73] should read:

--[73] Assignee: EMTEC Magnetics GmbH
Ludwigshafen, Germany--.

Signed and Sealed this

Twenty-second Day of May, 2001

*Attest:*

NICHOLAS P. GODICI

*Attesting Officer*   Acting Director of the United States Patent and Trademark Office